Aug. 8, 1939. N. R. LULAY 2,168,959
HYDRAULIC BRAKE
Filed Nov. 16, 1937

N. R. Lulay
INVENTOR

BY Victor J. Evans & Co.
ATTORNEYS

Patented Aug. 8, 1939

2,168,959

UNITED STATES PATENT OFFICE 2,168,959

HYDRAULIC BRAKE

Nicholas R. Lulay, Sublimity, Oreg.

Application November 16, 1937, Serial No. 174,886

2 Claims. (Cl. 188—78)

This invention relates to hydraulic brakes and more particularly to brake shoes and the actuating means therefor of brakes of the character mentioned and has for the primary object the provision of an efficient and inexpensive arrangement for bringing about even pressure and contact of the brake shoes with the brake drum and throughout the entire length of the shoes, thereby assuring even wear on the brake shoes and the drum and thereby prolonging the life of the shoes or the linings thereof as well as providing more efficient braking action.

With these and other objects in view, this invention consists in certain novel features of construction, combination and arrangement of parts to be hereinafter more fully described and claimed.

For a complete understanding of my invention, reference is to be had to the following description and accompanying drawing, in which—

Figure 1 is a vertical sectional view illustrating brake shoes and operating means therefor constructed in accordance with my invention.

Figure 2 is a sectional view taken on the line 2—2 of Figure 1.

Referring in detail to the drawing, the numeral 1 indicates a brake drum, 2 an axle housing and 3 a shield plate for substantially closing the drum and carried by the housing 2. The parts described are of a conventional construction in automobiles and similar devices. Arranged in the brake drum 1 are opposed arcuately curved brake shoes 4 each including a peripheral portion 5 and a flange 6 integral therewith. The peripheral portion 5 may have the usual brake lining (not shown) applied thereto. Intermediate the ends of the brake shoes 4 are pivot bolts 7 for connecting to the brake shoes arcuately curved operating bars 8 each including side plates 9 joined together at one end of the bar. The joining of the side plates of the bars together forms a bearing surface A for the brake operating means 10 to engage. In this instance the brake operating means is of the hydraulic type, however, it is to be understood that other adaptable types may be employed if desired. The operating bars adjacent the brake operating means 10 are provided with slots 11 through which extend tie bolts 12 for guiding the movement of the operating bars. The opposite ends of the bars have pivoted thereto a connecting link 13. Coil springs 14 are connected to the brake shoes and to pins 15 mounted on the shield plate 3. The springs normally act to urge the brake shoes away from the drum and said brake shoes are limited in their movement away from the drum by adjustable stops 16 arranged between adjacent ends of the brake shoes. Each stop 16 consists of a bracket 17 mounted on the shield plate. The bracket is of substantially U shape and the arm portions have threaded thereto headed bolts 18 engageable with adjacent ends of the brake shoes. Lock nuts 19 are threaded on the headed bolts to engage with the brackets to prevent said bolts from accidentally turning in the brackets and losing their said adjustment.

The brake shoes being pivotally connected on the operating bars intermediate their ends and intermediate the ends of said brake bars provide a construction wherein a force applied to adjacent ends of the brake bars will apply the brake shoes with even pressure on the brake drum throughout the length of the brake shoes, thereby effecting more efficient braking action on the drum with a minimum amount of wear.

What is claimed is:

1. A brake mechanism, comprising, a brake drum, brake shoes positioned within said drum, a shield for closing said drum, operating bars pivotally connected together at one end and slidably and pivotally attached to said shield at the opposite end, said brake shoes pivotally mounted on said bars and independently of said shield and drum, springs connecting said shoes to said shield to normally position said shoes in non-braking position with respect to the drum, said shoes formed with oppositely disposed end faces, and fixed stops having adjustable elements interposed between the oppositely disposed faces of the shoes for limiting the movement of the shoes towards each other.

2. In a brake mechanism, a brake drum, a plate associated with said drum, operating bars pivotally connected together at one end and slidably and pivotally attached to said plate at the opposite end, brake shoes pivotally mounted on said bars and independently of said plate and drum, resilient means connecting said shoes to said plate to normally position said shoes in non-braking position with respect to the drum, said shoes formed with paired end faces, and adjustable means fixed to said plate and interposed between said paired end faces for limiting the movement of the shoes towards each other.

NICHOLAS R. LULAY.